Patented Oct. 18, 1932

1,883,644

UNITED STATES PATENT OFFICE

CARLETON ELLIS, OF MONTCLAIR, NEW JERSEY, ASSIGNOR TO ELLIS-FOSTER COMPANY, A CORPORATION OF NEW JERSEY

ALCOHOL-SOLUBILIZED NITROCELLULOSE AND PROCESS OF MAKING SAME

No Drawing. Application filed March 3, 1924, Serial No. 696,686. Renewed April 23, 1930.

This invention relates to a process of making alcohol-solubilized nitrocellulose and to the process of making same and of preparing solutions of such solubilized nitrocellulose. The present invention has for its object the treatment of nitrocellulose in its various forms such as gun cotton, smokeless powder, celluloid cotton, celluloid scrap, used moving picture film and the like to render such material soluble in ethyl alcohol. The latter is a vehicle of desirable qualities as regards the preparation of solutions for brushing, spraying and the like in making lacquers, paints, enamels, artificial leather coatings and the like from nitrocellulose; it is however practically a non-solvent for most nitrocellulose material. The present invention has for its object a method of producing solutions in alcohol of nitrocellulose which normally is insoluble in this medium.

The process involves treating nitrocellulose such for example as soluble cotton of high viscosity with a solution of alkaline alcohol. This may be carried out in the cold or by heating. Preferably the alcohol employed is fairly free from water. It is best to use alcohol of a strength greater than 95 per cent, and preferably a strength of 97 per cent or higher is desirable.

To render the alcohol of this strength appropriately alkaline I may use either caustic soda or caustic potash or ammonia. One way of carrying out the invention is to saturate dried alcohol with ammonia gas, add the soluble cotton which is insoluble in ethyl alcohol and agitate at room temperature. The cotton goes into solution with surprising rapidity. When solution is complete an acid such as an alcohol or acetone solution of phosphoric acid may be added to neutralize the ammonia and prevent further change. Other acids such as sulphuric or hydrochloric acid, acetic acid and the like may be used as neutralizing agents. If the action of the ammonia is not arrested immediately a reduction in viscosity occurs and eventually the films which are produced from the solution are lacking in strength. Hence it is desirable to arrest the action of the ammonia rather promptly to prevent too great a conversion and loss in strength and flexibility. After such solutions have been obtained in this manner they may be filtered if desired to remove any sediment or salts which separate due to the neutralizing step. A centrifuge may be used for this purpose if desired.

Concentrated solutions of the nitrocellulose thus may be obtained which may be incorporated with other solvents such as amyl acetate, butyl acetate, diethylcarbonate, furfural and other high boiling solvents acting as water-eliminants. Extending solvents such as benzol, toluol, xylol and the like may be added.

Various resins such as dammar, shellac, copal and the like, also synthetic resinous products such as rosin phthalic glyceride resin may be incorporated. Ordinary rosin esters may be used in some cases. Castor oil, rape oil, boiled or blown, may be used as softening agents. Substances such as diethylphthalate also may be used as softeners. Dyes and pigments may be incorporated if desired.

In one case 500 c. c. of ordinary denatured alcohol, Formula No. 2, was treated with 50 grams of anhydrous potassium carbonate. The mixture was warmed gently for half an hour and then distilled. A fraction between 78–80° C. was taken. It was found to have a specific gravity of .810. It would not dissolve a commercial grade of soluble cotton which happened to be available. The alcohol was then saturated with ammonia gas and this same cotton was found to dissolve very quickly simply by shaking it by hand in a bottle. The rapidity of disappearance of the cotton by going into solution was plainly visible and in fact very striking.

Anhydrous ethyl alcohol likewise may be used but since it is generally more costly to produce alcohol of this strength I prefer to employ alcohol of 97–99 per cent strength. The manner of reducing the water content of alcohol is immaterial and the illustration given above employing potassium carbonate is mentioned merely to indicate the particular method of preparation employed under the circumstances of the test given. Any method of dehydrating alcohol is within the purview of the invention. Both denatured alcohol and pure ethyl alcohol, anhydrous or of low water content may be employed.

The use of aqueous ammonia is undesirable because of the increase in water content and anhydrous ammonia gas therefore is preferable but aqueous ammonia may be used if the alcohol is not diluted substantially beyond the limits set forth above.

When the caustic soda or potash solutions are used the alkali may be present to the extent of 1 to 2 per cent and upwards on the weight of dried alcohol taken. Solutions made with ammonia are generally freer of sediment than is the case with the fixed alkalies. Other alkalies and alkaline salts of organic or inorganic acids may be used with greater or less efficiency. A base or basic compound which is soluble in alcohol is desirable. The activity of different bases and basic compounds will of course vary. The caustic alkalies, and in the preferred embodiment, ammonia represent the most effective basic substances cheaply obtainable. Ammonia has a desirable specific action or effect.

In the use of these strong alkalies the operator is cautioned against too long contact of the alkali unless the solution be of very low alkaline strength. The temperature of digestion of the nitrocellulose with alkali should be regulated with respect to the strength of the alkaline solution. The action may take place at room temperature or artificial cooling may be used. More resistant nitrocellulose may require stronger alkali and digestion at temperatures of 40 or 50° C. or higher.

Protracted contact of alkali yields brown solutions and when these are objectionable the action should be promptly arrested as soon as solution is effected and before any extensive drop in viscosity has taken place.

Ammonia may be added to the alcohol or the cotton may be fumed with the gas at various temperatures and under pressure if desired, or the cotton may be put in the alcohol and ammonia introduced.

Agitation of the mixture during solution may be employed to render the conversion more uniform.

A mixture of equal parts of dried alcohol and benzol was saturated with ammonia gas at room temperature. Nitro cotton, which would not dissolve in this mixture of solvents without ammonia, was found to go into solution immediately. A light-colored product giving a tough film resulted. On protracted standing without removal of the ammonia or neutralization a thin brown solution would result which would not give nearly as tough a film.

Such a neutral benzol (or toluol) and alcohol solution of nitrocellulose is a good basis for making lacquers, varnishes, paints, enamels, waterproof coatings, artificial leather, cements, etc.

Coatings of this character may be applied in a room supplied with artificially-dried air preferably containing less than 65 per cent of moisture required for saturation. Blushing is thereby eliminated. The solubilized nitrocellulose in any event appears to have a diminished tendency to blush and a lesser proportion of high-boiling solvent therefore may be used under moist atmospheric conditions.

An anhydrous mixture of 5 volumes of ethyl alcohol and 1 volume of ethyl acetate saturated with ammonia gas dissolved nitro cotton far more rapidly than when the ammonia was omitted.

What I claim is:—

1. The process of making solutions of alcohol-insoluble nitrocellulose in ethyl alcohol which comprises reacting on such nitrocellulose material with an alkaline solution of ethyl alcohol of low water content.

2. The process of making solutions of alcohol-insoluble nitrocellulose in ethyl alcohol which comprises reacting on such nitrocellulose material with an alkaline solution of ethyl alcohol of a strength greater than 95 per cent of alcohol, until a desired solution is obtained, and then neutralizing the solution.

3. The process of making solutions in ethyl alcohol of nitrocellulose which is normally insoluble in alcohol which comprises reacting on such nitrocellulose with an ammoniacal solution of ethyl alcohol of low water content.

4. The process of making solutions in ethyl alcohol of nitrocellulose which is normally insoluble in alcohol which comprises reacting on such nitrocellulose with an ammoniacal solution of ethyl alcohol containing from 97–99 percent alcohol, until a desired solution is obtained, and then neutralizing the solution.

5. The process of making solutions in ethyl alcohol of nitrocellulose which is normally insoluble in alcohol which comprises reacting on such nitrocellulose with an alkaline solution of ethyl alcohol of a strength greater than 95 per cent of alcohol, and arresting the action of the solubilizing material before any substantial drop in viscosity has occurred.

6. The process of treating solutions of nitrocellulose normally insoluble in the chosen solvent which comprises reacting on nitrocellulose with an ammoniacal solution of benzol and ethyl alcohol until a desired solution has been obtained, and then neutralizing the solution.

CARLETON ELLIS.